Feb. 20, 1945. J. C. SLONNEGER 2,369,806
SIGHTING AND CONTROL APPARATUS FOR MILITARY DEVICES
Filed May 11, 1942 5 Sheets-Sheet 1

Inventor
John C. Slonneger
By Jack A. Ashley
Attorney

Feb. 20, 1945. J. C. SLONNEGER 2,369,806
SIGHTING AND CONTROL APPARATUS FOR MILITARY DEVICES
Filed May 11, 1942 5 Sheets-Sheet 3

Inventor
John C. Slonneger
By Jack Ashley
Attorney

Feb. 20, 1945. J. C. SLONNEGER 2,369,806
SIGHTING AND CONTROL APPARATUS FOR MILITARY DEVICES
Filed May 11, 1942  5 Sheets-Sheet 5

Inventor
John C. Slonneger
By Jack A. Athley
Attorney

Patented Feb. 20, 1945

2,369,806

UNITED STATES PATENT OFFICE 2,369,806

SIGHTING AND CONTROL APPARATUS FOR MILITARY DEVICES

John C. Slonneger, Dallas, Tex.

Application May 11, 1942, Serial No. 442,486

21 Claims. (Cl. 33—48)

This invention relates to new and useful improvements in sighting and control apparatus for military devices.

One object of the invention is to provide an improved apparatus for controlling the adjustment of a military device, such as an artillery piece or searchlight, whereby rapid and accurate adjustment of the device may be automatically accomplished by merely manipulating the sighting apparatus and without the necessity of calculations or other outside information.

An important object of the invention is to provide an improved sighting and control apparatus for artillery pieces which may be rapidly operated in order to quickly and accurately adjust the artillery piece, whereby necessary corrections in the adjustment of the artillery piece may be made constantly, that is, between each firing operation and also whereby the point or location of the actual hit by the projectile is made the basis for subsequent corrective adjustment of the artillery piece, which assures accurate aiming to effect direct hits upon the target or objective; the apparatus being particularly advantageous for controlling artillery used in firing upon rapidly moving targets, such as aircraft.

A particular object of the invention is to provide an improved sighting and control apparatus for artillery pieces, the sighting apparatus being manually adjustable by the observer and having connection through the control apparatus with the artillery piece, which may be located at a remote point whereby normally any movement of the sighting apparatus automatically results in a similar movement of the artillery piece; the control apparatus including manually-controlled means for permitting separate movement, under certain conditions, of the sighting apparatus independently of the artillery piece, whereby corrective adjustments of the sighting apparatus may be made, after which the connection between said apparatus and artillery is re-established, whereby subsequent movement of the sighting apparatus again imparts movement to the artillery piece to correct the adjustment thereof.

Still another object of the invention is to provide an apparatus, of the character described, wherein a connection is set up between the sighting device between firing operations of the artillery piece to adjust said sighting device relative to the artillery piece, after which the device and piece are again connected and subsequent movement of the artillery piece is in accordance with the corrective adjustment made through the independent movement of said sighting apparatus.

A further object of the invention is to provide an improved sighting device having its sight mounted for vertical as well as horizontal swinging movement so as to be universally adjustable in all directions; the pivot or fulcrum points of the movable sight being located so as to coincide with the natural pivot point of the observer's head and also with the axis of the natural vertical pivot of the observer's body, whereby the observer may by a natural body pivot and without shifting his stance maintain the sight before his eyes throughout substantially a 180 degree arc in a horizontal plane and also whereby the natural upward movement of the head may be accomplished with the sight in place before the observer's eye and without a change in body position; the arrangement facilitating sighting since it permits the observer to cover a maximum area without changing his stance or forcing him into an unnatural body position.

A particular object of the invention is to provide an improved apparatus, of the character described, which is so constructed that the various parts thereof may be quickly and easily returned to a staring or "zero" position, whereby rapid and accurate sighting and adjustment of the artillery piece may be carried out which facilitates firing with greater accuracy, at a moving target.

A still further object of the invention is to provide an improved sighting device, of the character described, which is readily adjustable to the observer's height and which has the sight counterbalanced to facilitate movement thereof, the device also including a control panel located in such position as to permit manipulation of the control elements thereon by the observer while said observer is carrying out the sighting operation.

A construction designed to carry out the invention will be hereinafter described together with other features of the invention.

The invention will be more readily understood from a reading of the following specification and by reference to the accompanying drawings, wherein an example of the invention is shown, and wherein.

In the drawings, the numeral 10 designates a base which is cylindrical in cross section and which has its upper end closed by a cover 11. An upstanding, axial sleeve or housing 12 is preferably formed integral with the cover and extends upwardly therefrom. A shaft 13 is rotatable within the housing 12, as will be hereinafter described, and has its upper end extending therefrom. A crank arm 14 has one end fixed or secured to the projecting end of the shaft 13, whereby when the crank arm is swung, the shaft 13 is rotated.

A vertically-extending post 15 has its lower end mounted in the outer end of the crank arm 14 and an offset supporting bar 16 is adjustably secured to the post 15 by means of a clamp 17. Manifestly, the position of the clamp 17 may be varied on the post 15 to vary the elevation of the offset supporting bar 16. As is clearly shown in Figure 1, the bar 16 has a horizontal portion 16a and is then bent upwardly as illustrated at 16b to form a vertical portion; beyond the vertical portion, the bar is again bent upon itself to form a horizontal supporting arm or element 16c. A cylindrical housing or casing 18, which houses certain control apparatus, as will be hereinafter described, is provided with depending ears or brackets 18a and the outer or free end of the supporting arm 16c extends through openings in the ears or brackets and is suitably secured therein, whereby the housing or casing 18 is mounted on said arm. Manifestly, since the offset bar 16 is secured to the post 15 by the clamp 17, these members are in effect, a single supporting element and such supporting element, being mounted on the outer end of the crank arm 14, is movable or rotatable with the shaft 13. It is pointed out that it is preferable to key the lower end of the offset bar 16, as well as the post 15, within the clamp 17 so that said clamp is not rotatable relative to the members. In this manner, the bar 16 is maintained in a predetermined position with relation to the post 15 at all times.

Figures 1, 15:
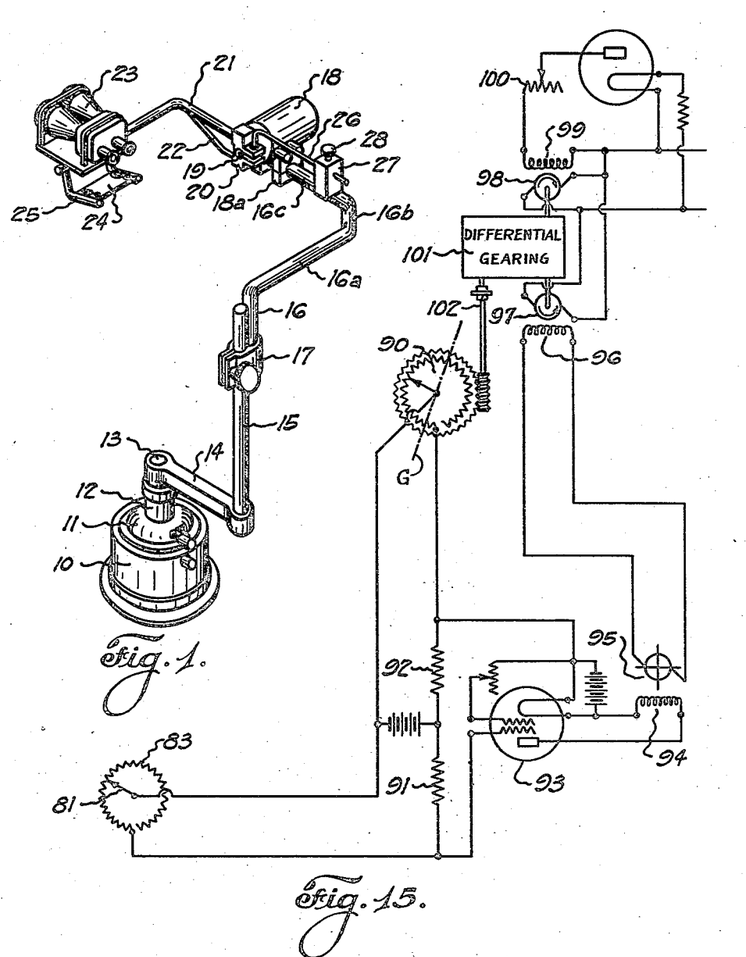
Figure 1 is an isometric view of a sighting and control apparatus constructed in accordance with the invention.
Figure 15 is a wiring diagram of one form of an electrical follow-up system which may be employed for adjusting the artillery piece, or other controlled device, in accordance with the movement of the sighting apparatus.
Figures 2, 3:
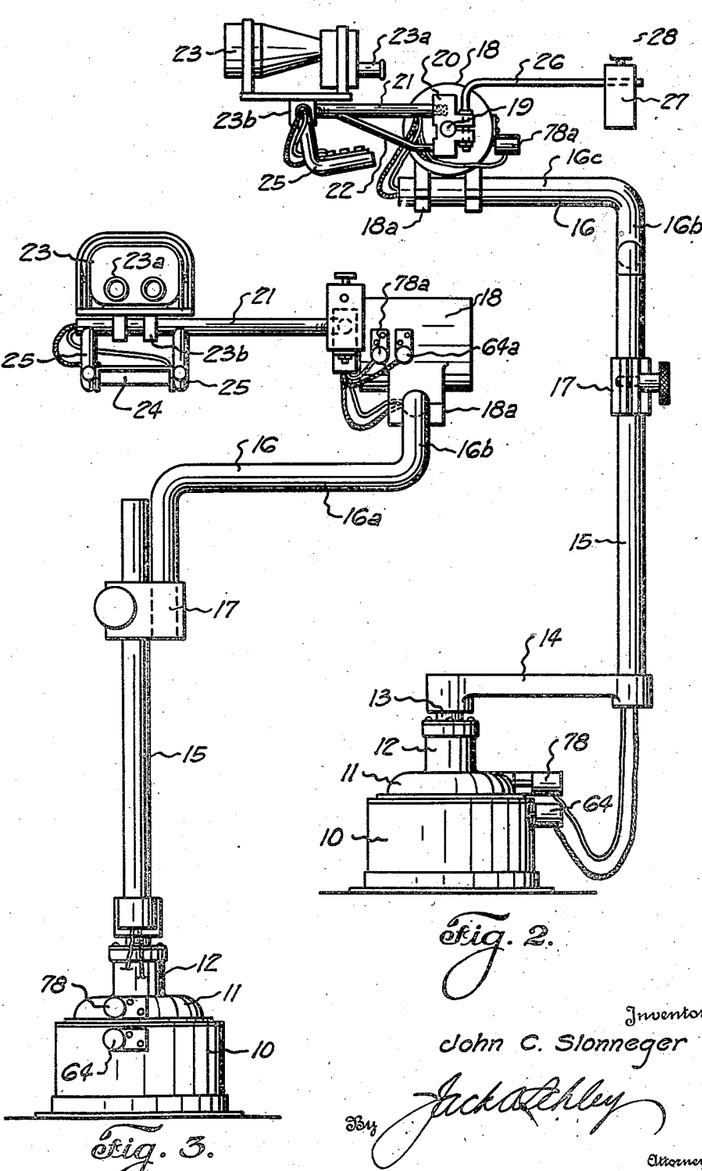
Figure 2 is a side elevation thereof.
Figure 3 is a rear elevation thereof.

A horizontal shaft 19 is rotatably mounted within the housing or casing 18 and has one end projecting therefrom. A supporting block 20 is fixed or secured on the projecting end of the shaft 19 and an angular supporting arm 21 is secured to the block 20, said arm projecting forwardly therefrom. A suitable brace 22 reinforces and braces the supporting arm. The forward end of the arm 21 is bent so that it extends more or less parallel to the horizontal portion 16a of the bar 16, as is clearly shown in Figure 1. A binocular prismatic sight 23 is mounted on the outer end of the supporting bar 21, the sight assembly being provided with depending ears 23b through which the arm 21 extends and to which said arm is welded or otherwise secured. A control panel 24 is supported beneath the sight 23 and is secured to angular pipe members or brackets 25, which have their upper ends welded or otherwise secured to the supporting arm 21 (Figure 3).

From the above, it will be seen that the sight 23 is carried by the outer end of the angular supporting arm 21 and said sight may be swung in a vertical plane, the pivot point being at the rotatable shaft 19. For counterbalancing the weight of the sight assembly, a horizontally extending rod 26 has one end secured to the supporting block 20, while its outer end carries a weight 27 which may be fastened in various positions thereon by a set screw 28.

In using the apparatus, the observer takes his stance directly astride the base 10, his body being positioned between the horizontal portion 16a of the offset bar 16 and the sight assembly supported by the angular arm 21. In such position, the vertical axis of the rotatable shaft 13 in the base will be in substantial alinement with the center of gravity of the observer which is the natural pivot point of the observer's body. The clamp 17 is then loosened and the sight assembly is adjusted so that the eye piece 23a of the sight which carries the telescope 23 will be brought directly before or in alinement with the observer's eye. The clamp 17 is then adjusted to lock the post 15 and the offset supporting bar 16 against vertical movement relative to each other.

The length of the supporting arm 21 which carries the sight 23 is such as to space the sight from the pivot shaft 19 and this spacing is such that when the observer's eyes are adjacent the eye piece of said sight, the horizontal axis of the shaft 19 will substantially intersect the observer's neck between the ear and shoulder near the apparent pivot of the observer's head. The observer may grasp the angular supports 25 which support the control panel 24 and may thus hold the sight before his eyes, said supports functioning as hand grips.

Manifestly, when the apparatus is properly adjusted to the observer's height as above described, the observer may hold the eye piece before his eyes and he may turn the apparatus in a horizontal plane while maintaining the eye piece before his eyes; this horizontal turning is permitted because of the rotatable shaft 13 and obviously, such turning of the sight in a horizontal plane will result in a rotation of such shaft. Obviously, the natural body pivot of as much as 90° to the right or to the left will permit the horizontal movement of the sight 23 without removing said sight from the observer's eye and without causing the observer to shift his stance. Also, the observer may move the sight in a vertical plane, such vertical movement resulting in a rotation of the shaft 19 as this is the point of pivot. By moving his head and hands in unison, such vertical movement of the sight can be accomplished without removing said sight from the observer's eyes. Thus, it will be seen that a wide area may be covered without the observer having to change or alter his original position or stance.

It might be noted that the arrangement is particularly adaptable in locating a rapidly moving target such as aircraft. In such instance, the observer will first attempt to locate the target with the unaided eye and this he may do by merely lowering the sight 23 without moving his head from its original position. When the target is located, it is only necessary to raise the sight 23 by raising his hands and thus bringing the eyepiece before his eye and in this manner, the target will be immediately brought into the field of the sight. Due to the universal mounting of the sight, together with the arrangement whereby the observer does not change his position or stance, a rapidly moving object may be followed by the sight 23 in as simple a manner as such object may be followed by a pair of hand binoculars.

Although any suitable sight may be mounted on the supporting arm 21, it would be desirable to employ a binocular sight with one telescope having a high power and comparatively narrow field and another telescope having a lower power and much broader field. The lower power side would be used to spot objects generally, while the high power side could be employed for exact and accurate sighting. The observer could readily choose the side best suited to the purpose by simply closing one eye. As explained, the invention is not to be limited to this type of sight although the advantages of such sight are readily apparent.

When the sight 23 is moved by the observer in locating or sighting an object or target, such movement imparts a rotation either to the shaft 13, or to the shaft 19, or to both, depending upon whether the movement is horizontal, vertical, or both. The shaft 13 is adapted to control a mechanism which has connection with an artillery piece or other apparatus (not shown). This mechanism may be any of the well-known electrical follow-up systems so that the movement of the sight to a pre-determined position in a horizontal plane will result in the artillery piece being moved to a similar position. In other words, if the sight is moved 10° to the right, then the artillery piece will also be moved 10° to the right. The horizontal shaft 19 which is rotated by the vertical adjustment of the sight 23 is adapted to control the vertical elevation of the artillery piece (not shown), whereby an adjustment of the sight vertically will result in a similar adjustment of the artillery piece. Through the use of a repeater mechanism, the horizontal and vertical adjustment of an artillery piece or other apparatus may be accurately controlled by the movement or adjustment of the sighting apparatus.

In the firing of heavy artillery, it is usual that the sighting apparatus is located at some distance from the artillery piece which it controls and that the target is not necessarily visible to the gunners. Because the sighting apparatus is probably offset, or some distance from the artillery piece and because it is necessary to adjust the artillery piece for windage and to elevate for range, some provision must be made to offset the sight from the artillery piece or gun in order that the trajectory of the projectile of said artillery piece will bear upon the target when the sight bears upon the target. It is to accomplish the rapid offsetting and adjustment of the sight relative to the artillery piece so as to accurately aim said artillery piece, that the present control mechanism has been provided.

Briefly, the mechanism is arranged so that normally the sight and the artillery piece are connected by a follow-up mechanism or arrangement and when the sight bears upon the target, the artillery piece also bears upon the target. Also, the movement of the sight, either vertically or horizontally, will result in a similar movement of the artillery piece. In using the device, the obsever first directs the sight 23 squarely on the target and then actuates the mechanism, as will be described, to lock the artillery piece against movement. The range is then estimated and the sight is moved downwardly or upwardly as the case may be, such movement being independent of the artillery piece which is locked at this time; also, at the same time, the sight may be offset a desired number of degrees horizontally. The offset and elevation may be accurately effected by means of the usual horizontal and vertical stadia lines with which the telescopic sight are usually provided or the skilled observer may estimate the offset and elevation required from previous experience. After this offset or adjustment of the sight is made, the mechanism is again operated to connect the sight with the gun and then when the sight is again brought to bear upon the target, the gun is moved in accordance with the previous adjustment and if the calculations ar correct, a direct hit should be scored.

After the first shot is fired and in the event said shot misses the target, the observer can see where the actual hit was made and at that time, the mechanism is again operated to lock the gun against further movement. The sight is then further adjusted relative to the gun by directing said sight onto the point where the actual hit was made and when the sight reaches such point, the mechanism is again operated to connect the sight and gun so that movement of the sight will impart movement to said gun. With the sight apparatus again connected to the gun, the sight is brought to bear upon the target and all allowances for windage, range and offset have been made. The firing should now be very accurate and rapid fire from the guns may be carried out. It might be that even after the adjustment was made following the first or trial shot, the guns are still not adjusted to bear directly on the target and if not, the operation may be repeated, the observer utilizing the point of the actual hit as a basis for the subsequent adjustment.

From the foregoing, it will be seen that the adjustment of the gun is carried out by noting the position or point at which the trial shot hits. This point or location is made the basis by which the apparatus is adjusted and therefore, it is not necessary to carry out calculations to determine how much adjustment should be made. The apparatus may be quickly and easily adjusted by merely locking the gun in its previously adjusted position and moving the sight to offset said sight a proper number of degrees from the gun. In this way, the sight may then be brought to bear directly on the target and when so directed, the gun will be properly aimed to score direct hits on said target.

As explained, the rotation of the shaft 13 which is effected by the horizontal adjustment of the sight 23 controls the horizontal adjustment of the artillery piece or other apparatus. The rotation of the shaft 19 which is effected by the vertical adjustment of the sight 23 controls the vertical adjustment or elevation of the artillery or gun. In order to permit the predetermined movement of the sight to offset said sight in the proper manner, as has been described, it is necessary that a control mechanism be provided so that the sight may be moved either independently of the artillery piece, or the artillery piece and sight may be moved simultaneously. This control mechanism is housed within the base 11 and is associated with the shaft 13; additional control mechanism, of identical construction is disposed within the casing 18 within which the shaft 19 is mounted and is associated with said shaft. Since the control mechanisms in the base 10 and the casing 18 are identical, it is believed that a description of one will suffice. Therefore, only the control mechanism within the base 10 has been illustrated and will be described.

Figure 4:
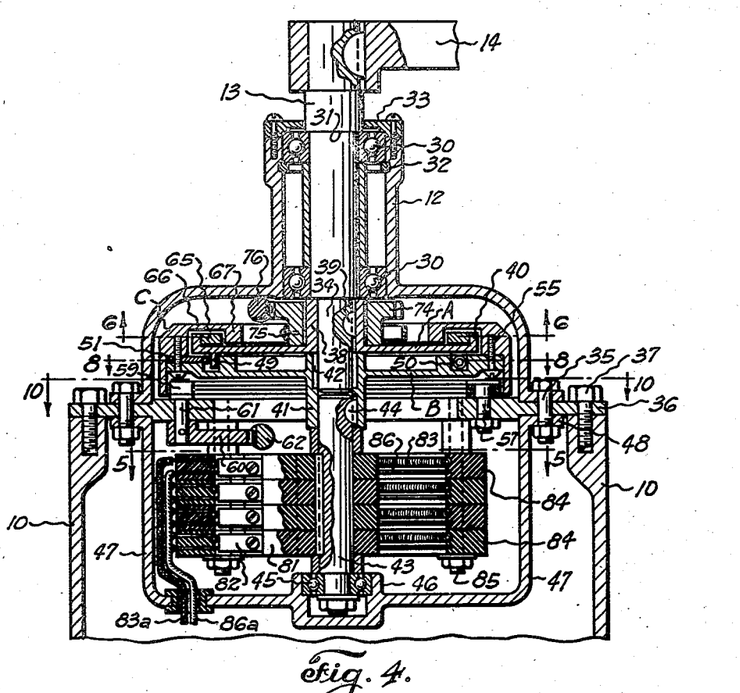
Figure 4 is an enlarged vertical sectional view taken through the base of the apparatus and showing the control apparatus.

As is clearly shown in Figure 4, the shaft 13 extends axially through the sleeve 12 of the cover 11 and depends within the cover, being supported in suitable upper and lower bearing assemblies 30. The upper portion of the shaft is formed with an integral enlarged collar, whereby an external shoulder 31 is formed on the shaft and this shoulder rests upon the upper bearing assembly 30, which assembly is held in place within the sleeve 12 by a snap ring 32. A closure plate 33 overlies the upper bearing assembly and is secured to the top of the sleeve 12 by suitable screws. The lower portion of the shaft 13 is reduced to provide a downwardly extending axial shank 34. The cover 11 is secured by bolts 35 to an annular supporting ring 36, which ring is, in turn, fastened to the upper end of the casing or housing of the base 10 by cap screws 37. Manifestly, with this arrangement, the ring 36 and cover 11 co-act to close the upper end of the casing of the base.

The reduced shank 34, at the lower end of the rotatable shaft 13, has a clutch plate A keyed or otherwise fixed thereon. As is clearly shown in Figure 4, the clutch plate A is formed with an integral, axial collar 38 which is connected to the shank by a key 39. The outer peripheral edge portion of the clutch plate is formed with an upwardly-projecting flange 40 which extends completely around the plate.

A re-alining and drive plate B is disposed below the plate A and is provided with a central or axial sleeve or collar 41, which receives the extreme lower end of the shank 34 of the shaft 13. It is noted that the shank is rotatable within the upper portion of the collar 41 of the plate B, such rotation being facilitated by roller bearings 42 interposed between the parts. The upper end of a driven shaft 43, which will hereinafter be referred to as a control shaft, is engaged within the lower portion of the collar 41 of the plate B and is connected thereto by a suitable key 44, whereby when the plate B is rotated, the control shaft 43 is also rotated. The lower end of the control shaft is mounted in suitable bearings 45 which are supported within a collar 46 made integral with an internal housing 47. The housing 47 is disposed within the base 10 and has an outwardly directed annular flange 48 at its upper end. The bolts 35 which fasten the cover 11 to the supporting ring 36 also serve to fasten the flange 48 to the under side of the said supporting ring, whereby said housing is mounted within the base 10.

Figures 6, 7, 8, 9:
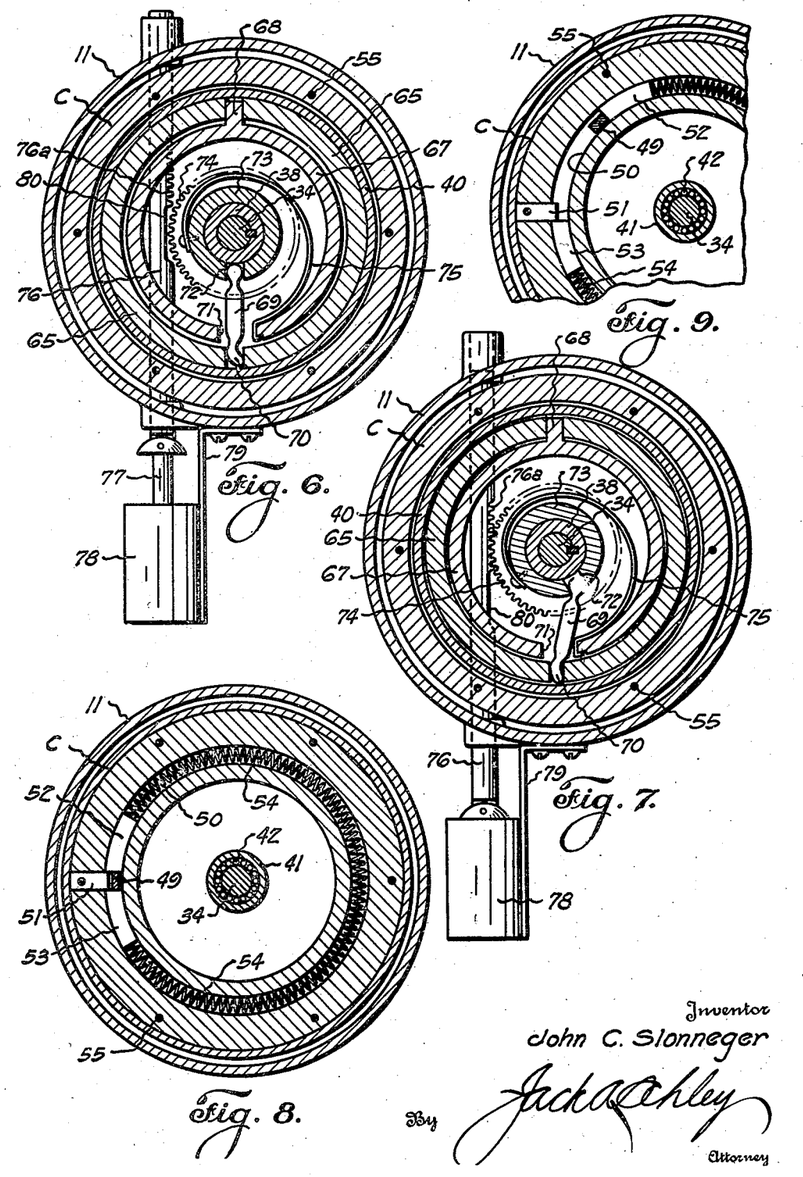
Figure 6 is a horizontal cross-sectional view, taken on the line 6—6 of Figure 4 and illustrating the clutch mechanism in its engaged or clutching position.
Figure 7 is a view, similar to Figure 6, with the clutch in its disengaged or non-clutching position.
Figure 8 is a horizontal, cross-sectional view, taken on the line 8—8 of Figure 4, illustrating the realining means for realining the sight and controlled artillery piece or other element.
Figure 9 is a partial view of the parts shown in Figure 8 and illustrating the movement of one of the follower blocks of said realining means.

The clutch plate A which is rotated by the shaft 13 is connected with the re-alining and drive plate B by means of a lug 49 which is preferably formed integral with the under side of the clutch plate A and which engages within an annular channel 50 formed in the peripheral portion of the plate B. The lug 49 is normally held opposite a stop element or bar 51 which is secured to the upper surface of the plate B and which projects into the annular channel 50, as is clearly shown in Figure 8 and the transverse width of the bar 51 is substantially equal to the transverse width of the lug 49. For maintaining the lug normally in alinement with the stop element or bar, as shown in Figure 8, a pair of arcuate follower blocks 52 and 53 are slidable within the channel 50. A coiled spring 54 which is confined within the channel 50 and which has its opposite ends engaging the blocks 52 and 53 constantly urges said follower blocks toward each other. Manifestly, since the stop element or bar 51 projects into the channel 50, said element is in the path of the follower blocks and the spring 54 will normally hold said blocks in engagement with said element or bar, the lug 49 of the clutch plate A being confined between said blocks. It is pointed out that the position of the stop element or bar 51, in a vertical plane, is shown as alined with the sight 23 which is carried by the various supporting elements mounted on the shaft 13. In other words, with the sight in the position shown in Figure 2, the lug 49 is in the position shown in Figures 4 and 8, which will be referred to as the "zero" position.

When the re-alining or drive plate B is held stationary, any movement of the sight 23 which will result in a rotation of the shaft 13, will cause a rotation of the clutch plate A. Such rotation of the plate A will cause the lug 49 to move away from the stop element or bar 51, such movement being permitted by the spring 54 which will be compressed to a further extent. Of course, the direction of movement of the lug 49 within the channel 50 will depend upon the direction of the rotation of the shaft 13 which in turn, will be dependent upon the direction of the movement of the sight 23. Assuming that the sight has been moved so as to move the lug 49 to the position shown in Figure 9, it will be seen that the lug is offset from the stop bar 51. So long as the re-alining or drive plate B is locked against movement, a relative movement of the clutch plate A to the plate B may occur. In the event that the sight 23 is released, the spring 54 acting upon the followers 53 and 52 will immediately return the clutch plate A to its original position, that is, with the lug 49 opposite the stop element or bar 51. Thus, it will be seen that when the plate B is locked against movement, an independent rotation of the plate A may be accomplished. A release of the sight 23 which controls rotation of the shaft 13 and plate A will cause an immediate realinement of the lug 49 with the stop element 51, whereby the plate A will return to its original or zero position relative to the plate B.

Figure 10:
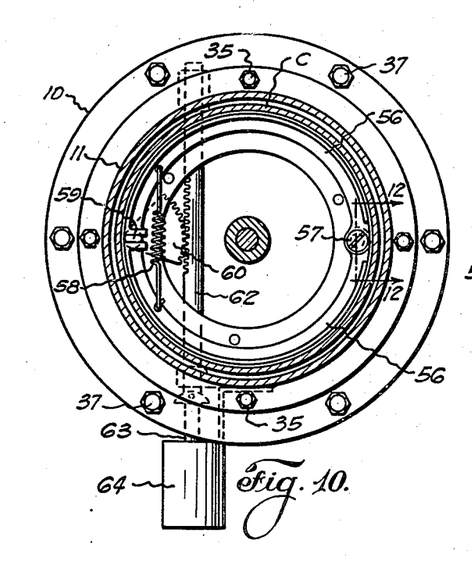
Figure 10 is a horizontal, cross-sectional view, taken on the line 10—10 of Figure 4 and showing the braking means in disengaged position.
Figures 11, 12:
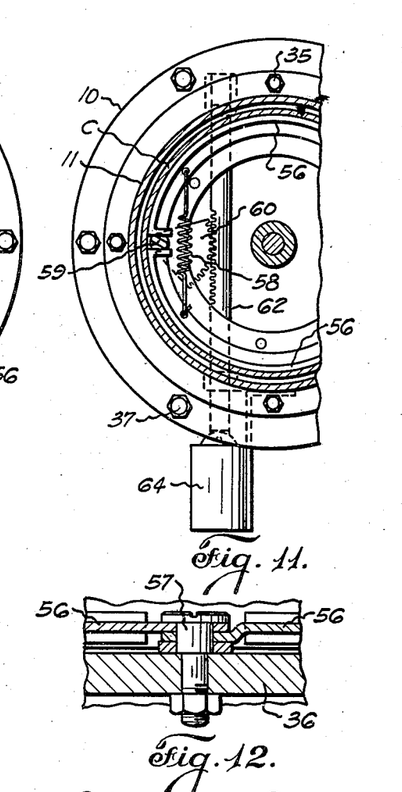
Figure 11 is a partial view, similar to Figure 10, with the braking means in an engaged position.
Figure 12 is an enlarged, vertical sectional view, taken on the line 12—12 of Figure 10.

For locking the re-alining or drive plate B against movement, a brake drum C is secured to the plate B by means of screws 55. As is clearly shown in Figure 4, the upper portion of the brake drum C is enlarged and overhangs the outer periphery of the plate B, this enlarged portion receiving the screws 55. The drum extends downwardly in a plane below the bottom of the plate B and the inner surface of the brake drum is adapted to coact with the pair of pivoted brake shoes 56 (Figure 10). One end of each brake shoe is pivotally mounted on a pin or bolt 57 which extends through the main supporting ring 36 (Figures 4 and 12), whereby the brake shoes may be swung outwardly and inwardly of the braking surface of the drum C. The outer or free ends of the brake shoes 56 are constantly pulled toward each other by a coiled spring 58 which has its opposite ends connected to the brake shoes and which constantly exerts its pressure to hold the shoes away from the braking surface of the drum C, as is clearly shown in Figure 10.

For moving the brake shoes 56 into engagement with the drum C and into braking position, an actuating lug 59 is confined between the free ends of the brake shoes. This lug is relatively flat and extends upwardly between the ends of the brake shoes, said lug being adapted to be rotated by a gear quadrant or segment 60. The gear quadrant or segment is disposed below the supporting ring 36 and is secured to a stub shaft 61 which is journaled within said ring, and the lug 59 is fastened to the upper end of the stub shaft; obviously, when the gear segment is swung, the shaft 61 and the lug 59 carried thereby is rotated. A rotation of the lug 59 causes said lug to be moved to the position shown in Figure 11, whereby the brake shoes are separated from each other at their free or outer ends an increased distance with the result that the arcuate surfaces of said shoes are moved into engagement with the braking surface of the drum. So long as the lug remains in the position shown in Figure 11, the brake shoes are in a braking position and are held so by said lug.

For actuating or swinging the gear quadrant or segment 60 to effect rotation of the lug, a horizontally extending gear rack 62 is in constant engagement with the teeth of said quadrant or segment. The end of the gear rack 62 extends outwardly through the wall of the inner housing 47 and has its outer end secured to the armature 63 of an electrical solenoid 64. When the solenoid is de-energized, the gear rack is in the position shown in Figure 10 and the brake shoes are disengaged from the brake drum C in a nonbraking position. When the solenoid 64 is energized, the gear rack 62 is moved laterally to the position shown in Figure 11, such lateral movement swinging the gear quadrant or segment 60 and resulting in a rotation of the flat lug 59, whereby the ends of the brake shoes are spread and the surfaces of said shoes are moved into engagement with the inner surface of the brake drum and to a full braking position.

When the brake shoes 56 are applied, a rotation of the brake drum C is prevented and since this drum is bolted to the realigning and drive plate B, such plate is also locked against rotation. As explained, the drive plate is keyed or otherwise secured to the driven control shaft 43 and manifestly, when the plate is locked against rotation, rotation of the driven shaft 43 is prevented. As has been stated, when the plate B is locked against movement, the clutch plate A may be moved relative thereto because of the connection between the lug 49 of the plate A and the spring-pressed followers 52 and 53 within the channel 50 of the plate B.

For setting up a positive drive connection between the clutch plate A which is rotated by the shaft 13 and the re-alining and drive plate B, a pair of semi-circular clutch shoes 65 are mounted on the upper surface of the clutch plate A and are located adjacent the upstanding peripheral flange 40 of said plate. The outer surfaces of the shoes are adapted to engage the inner surface of the flange 40 to provide a frictional drive therewith. A lateral extension 66 is formed integral with the brake drum C and overlies the clutch shoes 65, the inner periphery of the extension having a downwardly projecting flange 67 which confines the clutch shoes in position adjacent the upstanding flange 40 of the plate A. The lateral extension 66 is formed with a depending drive lug 68 which extends downwardly between the ends of the clutch shoes 65, as is clearly shown in Figures 6 and 7.

When the clutch shoes are in a clutching position, and engaging the flange 40, a rotation of the plate A will result in a rotation of the clutch shoes 65 because of such frictional engagement. Since the drive lug 68 is confined between the ends of the clutch shoes, a similar rotation will be imparted to the brake drum C through the co-action of the shoes with the lug. The brake drum C is secured to the re-alining and drive plate B and it will be evident that said drive plate will also be rotated. Thus, when the clutch shoes 65 are in engaged position, a positive drive connection is had from the plate A, through the clutch shoes 65 and brake drum C to the re-alining and drive plate B.

When the clutch shoes 65 are moved inwardly so as to disengage the inner surface of the upstanding flange 40, a rotation of the plate A will not impart rotation to the shoes. There will merely be a slippage between the plate A and the clutch shoes, with the result that no rotation will be imparted to the plate B.

For controlling the engagement and disengagement of the clutch shoes 65, an actuating lever 69 (Figure 6) is supported on the clutch plate A. The outer end of the lever 69 is provided with an offset actuating dog 70 which is disposed between the ends of the clutch plate shoes 65, this dog being normally located diametrically opposite the drive lug 68 which extends between the opposite ends of the clutch shoes. As is clearly shown in Figure 6, the actuating lever projects through a cut-out or opening 71 provided in the depending flange 67 of the extension 66 of the brake drum C and the inner end of the actuating lever is engaged within a slot 72 which is formed in the hub 73 of a rotatable gear or pinion 74. The hub and gear are freely rotatable around the upwardly extending collar 38 which is made integral with the clutch plate A. A flat volute spring 75 has one end riveted or otherwise secured to the hub 73 of the gear and has its opposite end engaged within the opening 71 in the flange 67 of the brake drum extension 66, and this spring constantly urges the pinion in a clockwise direction (Figure 6). Normally, the spring 75 holds the parts in the position shown in Figure 6, in which position the actuating dog 70 of the lever 69 acts to spread the ends of the clutch shoes 65, whereby said shoes are maintained in frictional engagement with the upstanding flange 40 of the clutch plate A. In such position, a rotation of the clutch plate A will impart a similar rotation to the brake drum C through the clutch shoes 65 and drive lug 68, as has been explained. Thus, at this time, the rotation of the clutch plate will impart a similar rotation to the realining or drive plate B.

For disengaging the clutch shoes 65 and moving them to a non-clutching position, a horizontally extending gear rack 76 is mounted within the cover 11 and is disposed adjacent the pinion or gear 74. One end of the gear rack 76 projects outwardly through the cover and is secured to the armature 77 of a solenoid 78, which solenoid is mounted exteriorly of the cover on a suitable bracket 79. When the solenoid is de-energized, a recessed portion 80 formed on the gear rack is opposite the teeth of the pinion or gear 74, whereby the spring 75 may rotate the pinion or gear and move the parts to the position shown in Figure 6. When the solenoid 78 is energized, the gear rack 76 is moved laterally so that its teeth 76a engage the teeth of the gear or pinion 74 and thereby rotate said pinion in a counterclockwise direction. Such counterclockwise rotation of the pinion will result in moving the actuating lever 69 to the position shown in Figure 7, whereby the position of the actuating dog 70 between the ends of the clutch shoes 65 is changed. The movement of the dog 70 to the position shown in Figure 7 permits the clutch shoes to move inwardly away from the upstanding flange 40 of the plate A and thereby disengage the same. When the clutch shoes move inwardly, the frictional engagement or contact of the shoes with the flange of the plate A is broken and a subsequent rotation of the plate A will not impart a similar rotation to the brake drum C and to the re-alining or drive plate B. Of course, as soon as the coil 78 is again de-energized, the parts return to the position shown in Figure 6 with the clutch shoes 65 again moving to a clutching position.

From the foregoing, it will be seen that the clutch plate A is controlled by the rotation of the shaft 13. With both of the solenoids 64 and 78 de-energized, the clutch shoes 65 are in a clutching or engaging position, while the brake shoes 56 are in a non-braking or disengaging position. Any rotation of the shaft 13 which, as explained, is brought about by movement or adjustment of the sight 23, will rotate the plate A and through the clutch shoes will result in a rotation of the re-alining and drive plate B, whereby the driven shaft 43 is rotated in accordance with the rotation of the shaft 13. If the solenoid 64 is energized, the brake shoes 56 are moved into a braking position to lock the brake drum C and the lower or drive plate B in a nonrotatable position. Energization of the second solenoid 78 will result in the clutch shoes 65 being moved to the non-engaged position and when this occurs, any rotation of the shaft 13 will result in a rotation of the clutch plate A only. This rotation of the plate A is independent of any rotation of the plate B and such independent rotation is permitted because of the lug 49 being disposed between the spring pressed followers 52 and 53 within the channel 50 of the lower plate B. Therefore, with the brake applied and the clutch released, the clutch plate A may be rotated a predetermined number of degrees relative to the re-alining or drive plate B. Of course, if the sight is released at this time, the coil spring within the channel 50 will cause a re-alinement of the clutch plate A with the plate B, said spring causing a return of the plate to its original or starting position.

Figure 5:
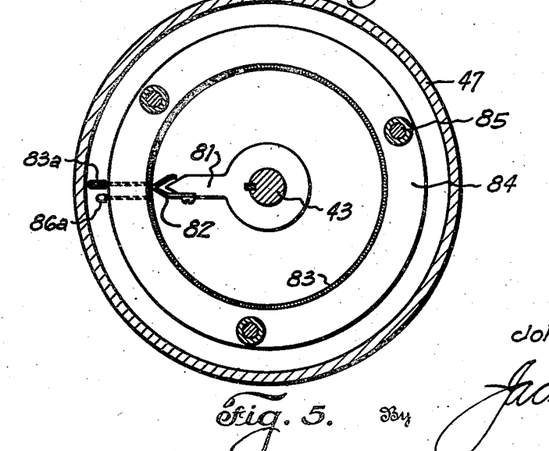
Figure 5 is a horizontal, cross-sectional view, taken on the line 5—5 of Figure 4 and showing one of the rheostats.

The shaft 43 which is controlled in its rotation by the plate B is arranged to control the position of a wiper arm 81, which arm is keyed or otherwise secured on said shaft (Figure 5). The arm 81 carries a metallic wiper or contact element 82 which is movable over a resistance coil 83 and said arm and coil form a rheostat or variable resistance. The coil is mounted within an insulated ring 84 which is supported by a plurality of posts or bolts 85 which extend downwardly from the supporting ring 36. A contact ring 86 is also mounted within the insulating ring and the wiper is adapted to engage both the ring and the coil, as is clearly shown in Figure 4. Electrical current is conducted to the ring through a wire 86a and to the coil by a wire 83a. Manifestly, since the wiper engages both the contact ring and the coil, the electrical circuit is completed through said wiper. Obviously, the position of the wiper relative to the coil will vary the resistance in the electrical circuit in which the rheostat, formed by the coil and wiper, is connected. Although only one rheostat has been described, a number of said rheostats may be mounted in superimposed relation on the supporting posts 85, and in Figure 4, four of such rheostats have been illustrated. The wiper arms of the rheostats are all mounted upon the control shaft 43, whereby all are operated simultaneously. Each rheostat is adapted to control one artillery piece or gun G, or other apparatus and by mounting four as shown, four distinct artillery pieces may be simultaneously controlled. It is noted that the radial position of the wiper arm 81 on the control shaft 43 is such as to be in alinement, in a vertical plane, with the stop element or bar 51 on the clutch plate B. Therefore, when the clutch plate A and the sight 23 are in a zero or starting position, with the lug 49 on the plate A opposite the stop element 51 (Figures 4 and 8) the wiper arm is vertically alined with the lug and sight. This position of all of the parts will be hereinafter referred to as the zero or starting position.

The movement of the wiper arm 81 to various positions on the coil 83 results in the control of the artillery piece or other apparatus (not shown). This control may be accomplished by means of a follow-up system and electrical mechanism which serves to connect the sighting apparatus with the artillery piece. For the purposes of this explanation, it will be assumed that the sighting and control apparatus herein described, is employed for controlling an artillery piece which is adjustable horizontally and vertically.

Any suitable follow-up mechanism which will respond to control by the adjustment of the rheostat may be employed but it is preferable to use a system such as disclosed in my co-pending application, Serial No. 431,608, filed February 19, 1942. A wiring diagram of this particular system is illustrated in Figure 15, the rheostat coil 83 and wiper arm 81 being shown in this figure. A rheostat 90, similar in construction to the rheostat 83, is mounted on the artillery piece or gun G at a convenient location and is controlled by the horizontal movement of said artillery piece on its vertical axis. The rheostat 90 is electrically connected with the rheostat 83 and a Wheatstone bridge arrangement which includes resistances 91 and 92 is connected in the circuit. The resistances are connected electrically with a thermionic valve 93 so as to control the potential applied to the grid of said valve. Assuming that the rheostatic elements 83 and 90 have identical resistances when the wiper arms are in the same relative position and that the resistances 91 and 92 onnected within the circuit are identical, then he potential applied to the grid of the thermionic alve or tube will be zero when the arms of the heostat are in the same relative position. Therefore, when the wiper arms of the two rheostats 83 and 90 are in the same relative positions, it might e said that the circuit is in balance. Any change n potential will cause a variation in the resistance of the grid of the valve or tube and will increase or decrease the current flowing through the field coils 94 of an amplidyne generator 95 he which has connection with said valve or tube.

The amplidyne generator 95 is employed for partially exciting the coils 96 of an electric motor 97 which motor is normally rotating at a predetermined speed. The motor 97 is synchronized or normally operating at a speed which is the same as the rotational speed of a second motor 98 connected in parallel with the motor 97. The field coils 99 of the second motor are separately and adjustably excited in part by a manually adjustable rheostat 100, whereby synchronization of the two motors may be readily effected.

The motors 97 and 98 are disposed opposite each other so that their armatures rotate in opposite directions. The motors are connected through a differential gearing (not shown) which is mounted within a housing 101, with an operating shaft 102, which shaft controls the horizontal adjustment of the artillery piece G and which is connected thereto by a suitable gear arrangement as shown in Figure 15. So long as the motors 97 and 98 are rotating at the same speed, the differential gearing effects no rotation of the operating shaft 102.

The rotational speed of the motor 97 will be varied upon any unbalancing of the rheostat circuit, which unbalancing would result in an increase or decrease of the current flowing through the field coils 94 of the amplidyne generator 95. Such unbalancing will occur when the rheostat arm 81 has been moved to another position on the coil 83 by the rotation of the shaft 13 through an adjustment of the sighting mechanism. When the unbalanced condition occurs, the rotational speed of the motor 97 is varied so that it is changed relative to the speed of the motor 98. When such change in the speed of the two motors occurs, the differential gearing (not shown) within the housing 101 will result in a rotation of the operating shaft 102, whereby the artillery piece will be rotated on its vertical axis to effect an adjustment in train of said artillery piece. Movement of the artillery piece will continue until the arm of its rheostat 90 which is controlled directly by a movement of the artillery piece will have assumed the same position as the arm 81 of the rheostat 83 controlled by the sighting apparatus. When the rheostat arms have again reached the same relative positions, the circuit is again in balance and the motor 97 is rotating at the same speed as the motor 98, with the result that further rotation of the operating shaft 102 is halted. As above pointed out, this particular follow-up system has been found adaptable for use with the present apparatus but any other system which will impart the same movement to the artillery piece when the sighting apparatus is moved a predetermined distance would be satisfactory.

From the foregoing, it will be evident that the rotation of the shaft 13 by the horizontal adjustment of the sight 23 will result in a movement of the wiper arm along the coil 83 of the rheostat and this movement will automatically accomplish a similar movement of the artillery piece or other apparatus being controlled. Thus, the artillery piece is moved on its vertical axis to adjust the same to various horizontal or lateral positions. A duplicate mechanism, similar to that mounted within the base 10 is located within the housing 18 within which the pivot shaft 19 on which the sight is pivotally supported, is mounted. This apparatus includes an external solenoid 64a which controls the braking action of the apparatus within the housing 18 and a similar solenoid 78a which controls the clutching action of said apparatus. A similar follow-up system (not shown) connects the rheostat within the housing 18 with the artillery piece so as to control the elevation adjustment of the same. Thus, any movement of the sight 23 in a vertical plane will result in a similar movement of the artillery piece in a vertical plane.

In describing the operation of the device, it is believed necessary to describe only the operation as effected by the rotation of the shaft 13 so as to control the horizontal adjustment of the artillery piece. Obviously, since the mechanism for controlling the vertical adjustment is exactly the same, except that it is controlled by the shaft 19, its operation is identical.

With the solenoids 64 and 78 de-energized, the brake shoes 56 are in a non-braking or disengaged position, while the clutch shoes are in a clutching or engaged position. It will be assumed that the lug 49 on the clutch plate A is opposite the stop element or bar 51 of the clutch plate B (Figure 8), being held so by the coil spring 54 acting against the followers 52 and 53. This will be referred to as the zero position and at this time, the lug 49 lies in the same vertical plane as the sight 23 and as the wiper arm 81, as has been explained. The wiper arm 81 of the rheostat 83 is in the same relative position with respect to its coil as the wiper arm of the rheostat 90 which is controlled by the artillery piece. Under such conditions, the electrical circuit is in balance and the motors 97 and 98 are rotating at the same speed, whereby the operating shaft 102 is stationary.

Assuming that the artillery piece is to be directed to bear upon a stationary target, it is first necessary to adjust the sight 23 with respect to the artillery piece so as to compensate for the difference in location of the sight and the artillery piece and also to compensate for windage and elevation for range. The observer takes his position straddling the base 10 and directs the sight 23 upon the target and this movement of the sight will result in a rotation of the shaft 13. Since the clutch shoes 65 are engaged and the brake shoes 56 are released, this rotation of the shaft 13 will result in a rotation of the clutch plate A and the realining or drive plate B, whereby the control shaft 43 is rotated a distance equal to the rotation of the shaft 13. The rotation of the control shaft 43 results in a rotation of the wiper arm 81, whereby the circuit within which the rheostats 90 and 83 are connected, is unbalanced. As explained, this unbalancing of the circuit results in a change of the speed of the motor 97, whereby rotation is imparted to the operating shaft 102 of the artillery piece. Therefore, the artillery piece is moved in a horizontal plane until the wiper arm of its rheostat 90 assumes the same relative position to its coil as the wiper arm 81 has assumed to its coil 83. In other words, the movement of the sight onto the target results in a similar movement of the artillery piece which is being controlled.

When the sighting apparatus is squarely upon the target, the solenoids 64 and 78 are energized, the solenoid 64 being energized first to apply the brake shoes 56 and lock the plate B, as well as the shaft 43 and the wiper arm 81 against any further movement. Subsequent energization of the second solenoid 78 releases the clutch shoes 65 so that an independent movement of the sight may be accomplished without effecting operation of the artillery piece. After the brake is applied and the clutch released, the sight is moved the desired distances both horizontal and vertical so as to take care of, and compensate for windage and elevation, as well as for offset, if desired. It is pointed out that the movement of the plate A relative to the locked plate B is permitted by the travel of the lug 49 within the channel 50 of the plate B and against the action of the spring 54. For example, the plate A might be moved a number of degrees as illustrated in Figure 9 of the drawings. When this adjustment has been completed, the solenoid 78 is de-energized to re-engage the clutch shoes 65 and thereby lock the plate A in its offset position relative to the plate B.

After the clutch shoes have been re-engaged, the solenoid 64 is de-energized to release the brake shoes 56 and then, a subsequent movement of the sight will result in a rotation of the wiper arm 81 of the rheostat 83. However, the plate A is now locked in an adjusted angular relation to the plate B and also the wiper arm 81.

After the foregoing adjustment has been made, the sight is again brought to bear upon the target and such movement will result in a similar movement of the artillery piece so that said artillery piece is offset and elevated relative to the target. Theoretically, at this time, the artillery piece is properly aimed to score a direct hit.

The solenoid 64 is again energized to lock the plate B and the rheostat against any possible movement, after which the artillery piece is fired, such firing being in the nature of a trial shot. Of course, if the shot scores a direct hit, no further adjustment is necessary. However, if the shot misses the target, a further adjustment may be readily made and this is done by re-energizing the solenoid 78 to again release the clutch shoes 65 so as to permit an independent movement of the plate A relative to the plate B. Upon release of the clutch shoes, the observer moves the sight 23 so as to bear directly upon the actual hit, that is, upon the point where the shell actually burst. Obviously, this moves the sight from off of the target onto the point of the actual hit and the number of degrees of movement of the sight is determined solely by the distance between such points. When the sight has been brought to bear upon the actual hit, the solenoid 78 is de-energized to again engage the clutch shoes 65 and thus, the plate A is again locked in a pre-determined offset position relative to the plate B. The solenoid 64 is then de-energized to release the brake shoes 56 and thereby again set up a direct connection between the plate A and the plate B. By returning the sight back to the target, the wiper arm 81 is further moved along its coil 83 and a subsequent adjustment of the artillery piece is made. After the sight again bears upon the target, the artillery piece should be directed onto the target with all allowances for offset, windage and range. The solenoid 64 is then again energized to lock the rheostat arm 8 against any movement and continued firing of the artillery piece may be carried out. Manifestly, if subsequent shots fail to strike the target, subsequent adjustment may be made in the manner above described. These adjustments may be rapidly accomplished by actuating the solenoids 64 and 78 for the horizontal adjustment of the artillery piece and the solenoids 64 and 78a for the vertical adjustment of said piece.

It is pointed out that the adjustment of the artillery piece is based primarily upon the location of the point where the actual hit is made. In other words, if the target is missed, the observer uses the location or point at which the actual hit occurred as a basis for his subsequent adjustment. In this manner, no calculation is necessary to finally bring the artillery piece into proper position.

An important feature of the invention is the arrangement whereby the various parts may be quickly returned to a zero or starting position. This may be done by energizing the solenoids to apply the brake and release the clutch, after which the observer releases his hand grip on the sight; the return to zero or starting position is automatically accomplished by the coiled spring 54 acting on the lug 49 through the followers 52 and 53 within the channel of the drive plate B whereby the lug 49 and the sight 23 are realined in a vertical plane, with the stop element 51 and the wiper arm 81. Each target will have a different range and offset and in the case of a moving target, the range and offset will be constantly changing and the advantages of the rapid return of the parts to zero position to permit subsequent readjustment for a new or moving target, are obvious.

Figure 13:
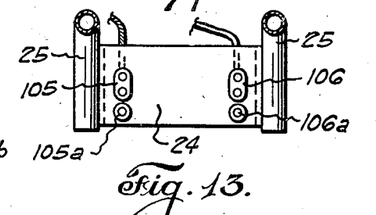
Figure 13 is an elevation of the control panel.

The solenoids 64, 64a, 78 and 78a may be controlled by any suitable means but it is desirable that they be actuated by the observer and for this reason, the control panel 24 is provided, (see Fig. 13). The panel carries a double switch 105 which controls the actuation of both of the solenoids 64 and 64a. A double switch 106 which controls actuation of the solenoids 78 and 78a is also mounted on the panel. If desired, push buttons 105a for controlling the brake solenoids and 106a for controlling the clutch solenoids may be provided in addition to the switches. The control switches and buttons are mounted on the control panel 24 within easy reach of the observer and may be actuated without the observer removing his eye from the eyepiece of the sight 23.

Figure 14:
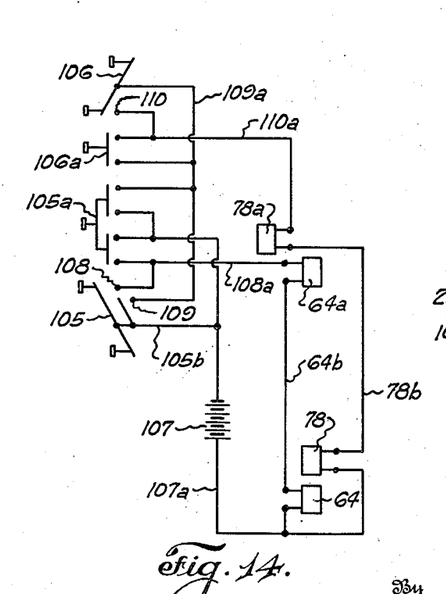
Figure 14 is a wiring diagram of the control panel and illustrating the electrical connections between the control elements and the clutching and braking means.

As is apparent from the description of the operation, it is necessary that the brake shoes 56 be applied to lock the plate B against movement before the clutch shoes 65 are released in order that the relative offset positions of the plates may not be destroyed, and although any suitable electrical connection may be employed for connecting the button or switch controls with the solenoids, it is desirable to employ the electrical hook-up shown in Figure 14. In this figure, the solenoids are supplied by crrent from a battery or other source 107. The switch 105 is connected by a wire 105b to one side of the battery and when in a closed position is adapted to engage two contacts 108 and 109 so as to close the circuit to these contacts. The contact 108 has connection through a wire 108a with one side of the brake solenoid 64a and then through a wire 64b with the second brake solenoid 64. The opposite side of this second solenoid is connected through a wire 107a with the other side of the battery circuit. Thus, it will be seen that when the switch 105 is first closed, electrical current is supplied to the solenoids 64 and 64a.

At the same time, current is conducted to the contact 109 which is connected by a wire 109a to the switch 106. When the switch 106 is closed it engages a contact 110 which is connected through a wire 110a to the clutch solenoid 78a. The solenoid 78a has connection through a wire 78b with the other clutch solenoid 78 and the opposite side of the latter solenoid is connected with the other side of the battery 107. With this arrangement, it will be manifest that the switch 105 must be closed before current can flow through the switch 106. Therefore, it is necessary that the brake solenoids 64 and 64a be actuated before the solenoids 78 and 78a may be operated. In this manner, it is impossible to release the clutch shoes 65 before applying the brake shoes 56.

The push buttons 105a and 106a function in the same manner as the double or toggle type of switches 105 and 106, except that each must be held in a depressed or circuit closing position. The button 105a, when depressed, closes the circuit to the solenoids 64 and 64a and at the same time conducts a flow of current to the other button 106a whereby subsequent depression of the button will operate the solenoids 78 and 78a. The particular electrical hook-up in Figure 14 is a safety feature which prevents actuation of the clutch mechanism prior to the time that the brake mechanism is applied. However, the invention is not to be limited to this particular hook-up as any suitable electrical connection between the control buttons and the solenoids may be employed.

In setting forth the operation, the use of the apparatus in firing upon a stationary target has been described but it is pointed out that the apparatus is particularly adaptable in following a moving target. The mounting of the sight 23 makes it possible for the observer to follow a moving target with as much ease as he could follow said target with a pair of hand binoculars. Also, it is apparent that the sighting apparatus is adjusted by the observer, the adjustment depending upon the point of the actual hit of the previous shot. The usual mathematical method of determining the necessary adjustment is eliminated.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A sighting and control apparatus for adjustable devices including, a sight mounted for angular adjustments about vertical and horizontal axes, a rotatable shaft connected with the sight and rotated in accordance with the horizontal adjustment of the sight, a second rotatable shaft connected with the sight and rotated by the vertical adjustment of the sight, a control mechanism associated with each shaft and including movable control means arranged to control the device to be adjusted, a clutch forming part of each control mechanism for setting up a positive connection between its shaft and control means whereby the shaft may be utilized to move said means in accordance with the sight, and means for leasing each clutch to permit independent movement of the shaft relative to the control means to permit an offset adjustment of the sight relative to the control means, the clutch being released and re-engaged whenever desired and irrespective of the relative positions of said shaft and control means.

2. A sighting and control apparatus for adjustable devices including, a sight mounted for angular adjustments about vertical and horizontal axes, a rotatable shaft connected with the sight and rotated in accordance with the horizontal adjustment of the sight, a second rotatable shaft connected with the sight and rotated by the vertical adjustment of the sight, a control mechanism associated with each shaft, each control mechanism including a rotatable control element adapted to control movement of the device to be adjusted, a clutch plate fixed on each rotatable shaft, a drive plate secured to each rotatable control element, and a releasable drive connection between the plates, whereby the rotatable shaft may be utilized to impart rotation to the control element so that said element is actuated in accordance with the movement of the sight which rotates the shaft.

3. A sighting and control apparatus for adjustable devices, including, a sight mounted for angular adjustments about vertical and horizontal axes, a rotatable shaft connected with the sight and rotated in accordance with the horizontal adjustment of the sight, a second rotatable shaft connected with the sight and rotated by the vertical adjustment of the sight, a control mechanism associated with each shaft, each control mechanism including a rotatable control element adapted to control movement of the device to be adjusted, a clutch plate fixed on each rotatable shaft, a drive plate secured to each rotatable control element, means for maintaining the clutch and drive plates in a predetermined or zero position relative to each other, and a normally engaged clutch connecting the plates, whereby the rotation of the clutch plate by the shaft will impart a similar rotation to the drive plate and the control element.

4. An apparatus as set forth in claim 3, together with means for releasing each clutch, and a brake for locking each drive plate and control element against movement when the clutch is released whereby each shaft and clutch plate may be moved relative to each drive plate and control element to permit the clutch plate to be offset from its zero or predetermined position with respect to the drive plate, thereby allowing the sight to be adjusted without actuating the control element.

5. A sighting apparatus including, a base, an upright supporting structure which is offset out of vertical alinement of the base and pivotally mounted on the base to swing on a vertical axis, a horizontal pivot shaft at the upper portion of the supporting structure, a sight mounted on the pivot shaft and movable in a vertical plane, the offset structure permitting an observer to straddle the base and use the sight with the vertical axis on which the structure swings substantially intersecting the natural pivot of the body of the observer, and means readily permitting the manual adjustment of the height of the structure whereby the axis of the horizontal pivot shaft on which the sight is mounted lies in substantially the same horizontal plane as the natural pivot of the observer's head.

6. A sighting apparatus including, a base, a vertical rotatable shaft mounted axially in said base, an upstanding offset support secured to the shaft and arranged to swing about the vertical axis thereof, a horizontal pivot shaft carried by the upper end of the support, a sight mounted on the pivot shaft and adapted to be swung vertically on the horizontal axis of said shaft, and adjustable means forming part of the support for varying the height of said support to properly position the horizontal shaft relative to the observer using the device.

7. A sighting and control apparatus for adjustable devices including, a sight mounted for angular adjustments about vertical and horizontal axes, a rotatable shaft connected with the sight and rotated in accordance with the horizontal adjustment of the sight, a second rotatable shaft connected with the sight and rotated by the vertical adjustment of the sight, a control mechanism associated with each shaft and including movable control means arranged to control the device to be adjusted, a clutch forming part of each control mechanism for setting up a positive connection between its shaft and control means whereby the shaft may be utilized to move said means in accordance with the angular adjustments of the sight, means for releasing each clutch to permit independent movement of the corresponding shaft relative to the control means to permit an offset adjustment of the sight relative to the control means, and a brake incorporated within each control mechanism for locking its control means against movement, whereby movement of said control means may be prevented upon release of the clutch for permitting relative movement of the shaft.

8. A sighting and control apparatus for adjustable devices including, a sight mounted for angular adjustments about vertical and horizontal axes, a rotatable shaft connected with the sight and rotated in accordance with the horizontal adjustment of the sight, a second rotatable shaft connected with the sight and rotated by the vertical adjustment of the sight, a control mechanism associated with each shaft and including movable control means arranged to control the device to be adjusted, a clutch forming part of each control mechanism for setting up a positive connection between its shaft and control means whereby the shaft may be utilized to move said means in accordance with the angular adjustments of the sight, means for releasing each clutch to permit independent movement of the corresponding shaft relative to the control means to permit an offset adjustment of the sight relative to the conrol means, and a brake incorporated within each control mechanism for locking its control means against movement, the clutch being releasable only upon locking of said control means by the brake, whereby independent movement of the control as well as movement thereof during the relative movement of the shaft is prevented.

9. An apparatus as set forth in claim 3 including, means for releasing each clutch, a brake for locking each drive plate and control element against movement when the clutch is released whereby each shaft and clutch plate may be moved relative to each drive plate and control element to permit the clutch plate to be offset from its zero or predetermined position with respect to the drive plate, thereby allowing the sight to be adjusted without actuating the control element, and means for automatically returning the plates to their zero position when said clutch plate is released after having been moved to an offset position.

10. An apparatus as set forth in claim 3 including, means for releasing each clutch, a brake for locking each drive plate and control element against movement when the clutch is released whereby each shaft and clutch plate may be moved relative to each drive plate and control element to permit the clutch plate to be offset from its zero or predetermined position with respect to the drive plate, thereby allowing the sight to be adjusted without actuating the control element, electrical solenoids associated with the clutch and brake, and manual control means for selectively energizing the solenoids to selectively operate said clutch and plate.

11. An apparatus as set forth in claim 3 including, means for releasing each clutch, a brake for locking each drive plate and control element against movement when the clutch is released whereby each shaft and clutch plate may be moved relative to each drive plate and control element to permit the clutch plate to be offset from its zero or predetermined position with respect to the drive plate, thereby allowing the sight to be adjusted without actuating the control element, and means for actuating the clutch and brake, the actuating means being arranged so that said clutch is non-releasable until said brake has been moved to a locking position.

12. A sighting apparatus including, a base having a vertical axis, an upright support which is offset out of axial alinement with the vertical axis of the base and pivotally mounted on the base to swing about said vertical axis, a horizontal pivot shaft at the upper portion of the support, and a sight mounted on the pivot shaft and angularly movable in a vertical plane, the offset support permitting an observer to straddle the base and use the sight with the vertical axis on which said support swings substantially intersecting the natural pivot of the body of the observer and with the axis of the horizontal pivot shaft substantially intersecting the natural pivot of the observer's head.

13. A sighting and control apparatus for adjustable devices including, a sight mounted for angular adjustments about vertical and horizontal axes, a movable element connected with the sight and movable in accordance with the angular adjustments of the sight, movable control means adapted to be connected with a device to be adjusted for controlling the movement of the device, and means for connecting the movable element with the control means, whereby the latter is actuated in accordance with the movement of the element and the angular adjustments of the sight, said connecting means including a clutch mechanism for engaging and disengaging the connecting means whereby the sight and element may undergo movement independently of the control means to allow offsetting of said sight and element relative to the control means, the clutch mechanism being operable at any time to engage and disengage said connecting means irrespective of the relative positions of the control means and the sight and element.

14. An apparatus as set forth in claim 13, wherein the connecting means includes means for returning the sight and movable element to their original position relative to the control means upon disengagement of the clutch mechanism and release of said sight following their movement to an offset position.

15. An apparatus as set forth in claim 13, with means associated with the control means for locking the same against movement when the clutch mechanism is disengaged for independent movement of the sight and movable element relative to said control means.

16. A sighting and control apparatus for adjustable devices including, a sight mounted for angular adjustments about vertical and horizontal axes, a rotatable shaft connected with the sight and rotated in accordance with the horizontal adjustment of the sight, a second rotatable shaft connected with the sight and rotated by the vertical adjustment of the sight, a control mechanism associated with each shaft and including movable control means arranged to control a device to be adjusted, means within each mechanism for detachably connecting its respective shaft with its respective movable control means whereby the shaft may be utilized to move said control means in accordance with the angular adjustments of the sight or may be disconnected from the control means to permit an offset adjustment of the sight without effecting movement of said control means, and means for actuating the connecting means to connect the control means to said shaft and disconnect the same therefrom whenever desired and irrespective of the relative positions of the shaft and control means.

17. An apparatus as set forth in claim 16 including, means associated with each control mechanism for automatically returning the sight and the shaft associated with said mechanism to their original position relative to the control means of the mechanism upon release of said sight and shaft following their movement to an offset position.

18. An apparatus as set forth in claim 16, with means for positively locking each control means against movement when said control means is disconnected from its shaft.

19. An apparatus as set forth in claim 16 including, electrically-operated means for controlling actuation of each detachable connecting means, means for positively locking each control means against movement when the latter is disconnected from its shaft, and additional electrically-operated means for controlling actuation of each locking means.

20. A sighting apparatus including, a sight mounted on a vertical axis so as to be movable in a horizontal plane and also mounted on a horizontal axis so as to be movable in a vertical plane, the vertical axis intersecting the natural pivot of the body of an observer operating the sight and the horizontal axis intersecting the natural pivot of the observer's head, and means readily permitting the manual adjustment of the height of said sight to properly position the horizontal axis of the same relative to the observer.

21. A sighting and control apparatus for adjustable devices including, a sight mounted for angular adjustments about vertical and horizontal axes, a movable element connected with the sight and movable in accordance with the angular adjustments thereof, a control mechanism associated with the movable element, the mechanism including a movable control element adapted to control movement of the device to be adjusted, a member carried by the movable element, a second member carried by the control element, normally-engaged means connecting the members, whereby the movement of the first member by said movable element imparts a similar movement to the second member and said control element, means for releasing the connecting means, means for locking the second member and control element against movement when said connecting means is released, whereby the movable element and first member may be moved to an offset position relative to said second member and control element and thereby permit the sight to be adjusted without actuating the control element.

JOHN C. SLONNEGER.